Patented Nov. 27, 1951

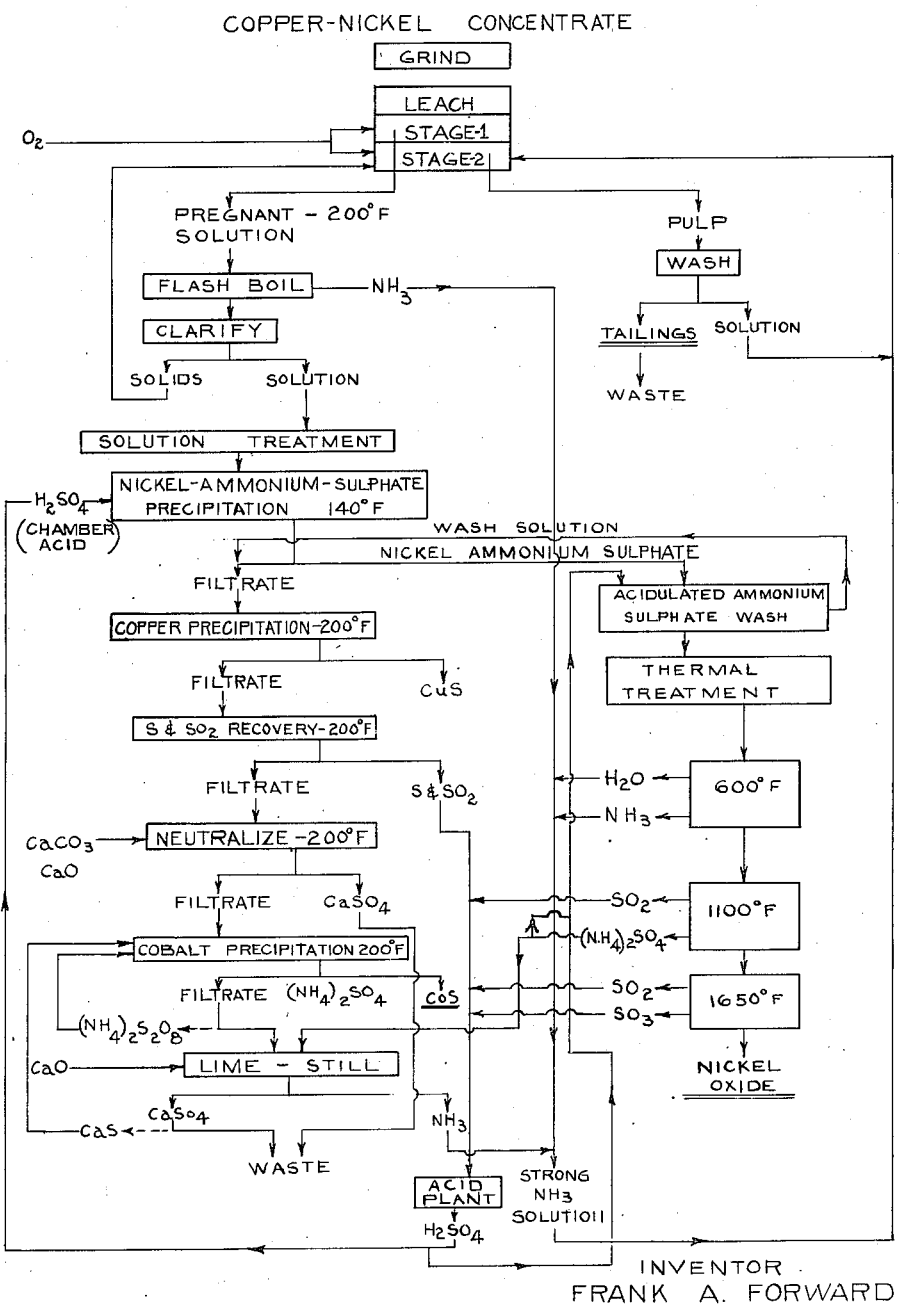

2,576,314

UNITED STATES PATENT OFFICE 2,576,314

EXTRACTING OF NICKEL VALUES FROM NICKELIFEROUS SULFIDE MATERIAL

Frank A. Forward, Vancouver, British Columbia, Canada, assignor to Sherritt Gordon Mines Limited, Toronto, Ontario, Canada, a corporation of Ontario Application November 6, 1948, Serial No. 58,644

8 Claims. (Cl. 23—190)

This invention relates to a process for treating nickeliferous ore, concentrate or matte for the extraction and recovery of the nickel values thereof together with the extraction and separate recovery of other economically recoverable metals which may have been associated with the nickel in the starting material.

Processes involving the leaching of nickeliferous oxide ore and concentrates with an ammonia-ammonium carbonate solution for the extraction of the nickel values thereof, and subsquent treatments of the resulting nickel solution are relatively well known in the metallurgical art as exemplified by the disclosures of United States Patents Nos. 1,346,175; 2,290,313; 2,400,114; 2,400,115; 2,400,098; and 2,400,461.

The processes of the prior art have the disadvantage that the starting ore or concentrate must be in oxide form and sulphide material must be subjected to preliminary oxidizing roasting and reducing operations, in which the sulphides are first converted to oxides and then reduced to metallic form, to prepare it for leaching.

An important object of the present invention is to provide a process for the extraction and recovery of the nickel values of a nickeliferous sulphide ore, concentrate or matte, by leaching the ore directly with a strong ammoniacal solution, substantially free from ammonium carbonate, without subjecting the ore to any preliminary oxidizing roasting and reducing operations.

A further object of this invention is to provide a process for separating and separately recovering the nickel values of the leach solution substantially free from the impurities with which it was associated in the leach solution.

A still further object of the invention is to provide a continuous and substantially cyclic process for treating nickeliferous sulphide ore, concentrate, and/or matte without preliminary conversion to oxide form for the efficient and economical extraction and separate recovery of the nickel values and associated metals such as copper and/or cobalt.

The method of the present invention of extracting nickel values from nickeliferous sulphides comprises, in general, the step of leaching finely pulverulent material consisting essentially of nickeliferous sulphides with strong aqueous ammonia in a reaction zone, agitating the mixture in the reaction zone, and feeding an oxidizing gas into the agitated mixture during the leaching operation.

An understanding of the invention may be had from the following description, reference being made to the accompanying drawing which illustrates a flow sheet of a preferred embodiment of the process.

The starting material is in the form of a nickeliferous sulphide ore, concentrate or matte ranging, for example, from an ore containing about 2% nickel to a concentrate containing from about 6% to about 17% nickel or a nickel sulphide matte.

In the case of nickel sulphide ore or matte, the starting material is first crushed to a size in which it is suitable for grinding to a relatively highly pulverulent condition. In the case of nickel sulphide concentrates from flotation cells, these are received from the cells in a highly pulverulent condition, for example, 80% minus 200 mesh to 70% minus 325 mesh, and they are ready for the grinding operation. The grinding operation may be conducted in a pebble mill or other suitable pulverizing mill. It is found that the finer the grind the better are the results obtained from the subsequent leaching operation both as to the velocity and the efficiency of the nickel extraction, but there is an economic balance between the cost of comminuting the material to a progressively finer degree and the value of the increased rate of leaching and the additional extraction of nickel values which may be readily determined for any specific sulphide material. I have found that very satisfactory leaching results are obtained by grinding the material to pass a 325 mesh standard Tyler screen.

The grinding operation is conducted in an atmosphere of oxygen and strong aqueous ammonia solution, for example, ammonium hydroxide of the order of about 28% ammonia. The oxygen may be introduced into the pulverizing mill as a stream of oxygen, oxygen enriched air, or air without oxygen enrichment. The pulp discharged from the grinding mill is of the order of about 80% solids.

The leaching operation may be conducted as a batch operation at atmospheric pressure. It has been found, however, that the maximum results as regards the velocity and the efficiency of the extraction of nickel values from the pulp are obtained when this operation is conducted under pressure and preferably in successive countercurrent stages with the ammonia, substantially free from ammonium carbonate, introduced into and the pulp tailings discharged from the final stage and the fresh pulp introduced into and the leach solution discharged from the first stage. If desired, of course, additional ammonia may be introduced at any stage of the leaching operation to ensure an adequate concentration of ammonia, particularly in the first stage.

It is known that an extraction of from 80% to 90% of the nickel of a pulp in which the nickel values are present as metallic nickel can be obtained by leaching the pulp with an ammonia-ammonium carbonate solution, but with carbonate in the solution the maximum nickel content of the solution appears to be of the order of about 16 grams per litre. I have found that a leach solution containing from 70 to 95 grams of nickel per litre with an extraction of nickel from a sulphide starting material of the order of 90% and higher may be obtained by leaching the sulphide pulp directly with a strong aqueous ammonia solution substantially free from ammonium carbonate. The pulp from the grinding stage is therefore leached with a strong ammoniacal solution substantially free from ammonium carbonate.

The pulp and concentrated ammonia are charged into a pressure vessel, such as a pachuca tank, to form a pulp having a predetermined liquid to solid ratio of the order of, for example, from about 1:2 to 3:1, the fresh pulp being charged in the first pachuca leaching tank and the fresh ammonia being charged in the final tank of the series. The tanks were maintained under a pressure of about 30 pounds per square inch and the contents of the tanks were maintained in an agitated condition by the introduction under pressure of a stream of air, oxygen enriched air or oxygen alone. The leach solution from each leaching step is preferably filtered before being passed to the next leaching step to maintain the predetermined liquid to solid ratio relatively constant.

Heat is generated during the leaching operation which raises the temperature of the leach solution, for example, from about 80° F. to about 150° F. to 180° F. This increase in temperature increases the leaching rate as the solubility of nickel ammonium salts increases as the temperature increases.

During the course of the leaching operation, the bulk of the nickel, copper, cobalt and sulphur are extracted from the pulp and put into solution. Some sulphur is produced as elemental sulphur and may be filtered off with the pulp tailing and may be recovered in this form, such as by flotation, if desired. A large proportion of the sulphur appears to go into solution, possibly as sulphates or thiosulphates combined with ammonia. Under the influence of the oxygen admitted under pressure into the leaching tank, the iron rapidly converts to ferric hydroxide, $Fe(OH)_3$, which is insoluble in the leach solution and forms a flocculent precipitate which is easily removed by filtration.

The pulp tailings discharged from the last tank of the series are filtered, washed, and discarded, the filtrate and wash solution preferably being returned to the leaching stage.

The pregnant leach solution from the first leaching tank containing the nickel, copper and cobalt in solution at a temperature of about 185° F. is filtered to separate the solids which are returned to the leaching stage and is heated to its boiling temperature, preferably flash boiled by subjecting it to pressure which is reduced quickly, to release the excess ammonia which may be returned to the leaching stage. Alternatively, the pulp may be boiled as it is discharged from the first pachuca tank without filtering.

By the foregoing grinding and leaching process, I have found it possible to obtain a leach solution substantially free from iron and containing in solution from about 70 to 95 grams of nickel per litre and the bulk of the copper and cobalt associated with the nickel in the feed material to the grinding step.

The nickel, copper and cobalt may be separately recovered from the leach solution by any one of several methods which may be selected from the point of view of the efficiency of the metal recovery and the capital and operating costs involved. I have found that the nickel and the metals associated therewith in the leach solution may be separately recovered conveniently and inexpensively by precipitating and recovering the nickel as nickel ammonium sulphate and thereafter treating the solution for the separate recovery of the nickel and the cobalt by the method described in detail hereinafter.

Sulphuric acid is added to the filtrate to reduce the hydrogen ion concentration to about pH 6 to convert the nickel in the solution to an insoluble nickel ammonium sulphate precipitate which may be separated from the solution by filtering.

Preferably, the concentration of the sulphuric acid and the rate at which it is added are such that the temperature of the solution is not increased to the extent that thiosulphates in the solution are decomposed prematurely. Very satisfactory precipitating results are obtained employing a 1:1 sulphuric acid solution with constant agitation to maintain the temperature of the solution below about 150° F. Sufficient acid is added to reduce the pH of the solution from about 8.0 to about 6.0. The reaction between the sulphuric acid and the solution appears to proceed in two stages as the ammonia is neutralized. In the first stage, the free ammonia is converted to ammonium sulphate and in the second stage, at about pH 6.8, a second reaction takes place in which the sulphuric acid reacts with the nickel compounds present to produce nickel ammonium sulphate which, being insoluble in ammonium sulphate solution, precipitates.

The nickel ammonium sulphate precipitate is separated from the solution by filtration and is preferably washed with acidulated ammonium sulphate solution to remove the major portion of any copper which may be present. The wash solution may be returned to the filtrate from the precipitation step for the recovery of the copper.

The nickel ammonium sulphate precipitate substantially free from impurities is progressively heated, first to a temperature of about 600° F. to drive off water and ammonia, then to about 1100° F. to decompose the nickel ammonium sulphate compound and drive off sulphur dioxide and ammonium sulphate, then to about 1650° F. to decompose the nickel sulphate to drive off the sulphur dioxide and sulphur trioxide, resulting in a final nickel oxide product substantially free from impurities.

The filtrate from the nickel ammonium sulphate precipitation step contains the bulk of the copper and cobalt originally contained in the starting material, probably as sulphates or thiosulphates or as ammonia complexes after the nickel has precipitated. The copper may be separated from this filtrate by heating the solution to from about 170° F. to about 190° F. with agitation which converts the copper to and precipitates it as a coagulated copper sulphide (CuS)

together with any precious metals which may have been dissolved in the leaching step, in which form it may be readily filtered from the solution.

The hot filtrate from the copper sulphide filtering step contains colloidal sulphur and sulphur dioxide from the decomposition of thiosulphates. This sulphur and sulphur dioxide may be removed by boiling the solution to drive off sulphur dioxide and removing the sulphur by filtration. This sulphur may be recovered and converted to sulphuric acid for use within or without the process.

The filtrate from the sulphur removal step contains cobalt, sulphate, ammonium bisulphate, and a little nickel sulphate and is from about pH 2 to pH 5. The cobalt and associated nickel may be recovered by neutralizing the solution with calcium carbonate with the possible addition of calcium oxide, to produce calcium sulphate which is precipitated and filtered off leaving the cobalt in solution from which it may be precipitated as cobalt sulphide by the addition of sodium sulphide, preferably aided by the addition of an oxidizing agent such as ammonium persulphate, and separated from the solution by filtering, leaving a filtrate comprising ammonium sulphate and ammonium hydroxide produced by calcium oxide in the neutralizing step. The ammonia may be regenerated from this filtrate by reacting it with calcium oxide and boiling the mixture in a lime still to produce ammonia which may be recovered and calcium sulphate.

As a specific embodiment of the invention, a nickeliferous sulphide concentrate comprising 6.89% nickel; 0.55% copper; 29.9% iron; 24.4% sulphur; and 25.4% insoluble matter was treated by the process described above. This concentrate was received from the flotation cells in a pulverulent condition of the order of about 80% minus 200 mesh to 70% minus 325 mesh standard Tyler screen. The concentrate was ground in a pebble mill with concentrated ammonium hydroxide (28% $NH_3$) in the ratio of about 2.5 parts concentrate to one part aqueous ammonia to the fineness of the order of about 325 mesh standard Tyler screen and a pulp density of about 80% solids. Some nickel and copper were dissolved during grinding which imparted a dark blue color to the liquid of the pulp which was found to contain from 2 to 10 grams of nickel per litre.

This pulp was leached in three successive stages in pachuca tanks under a pressure of about 30 pounds per square inch employing a stream of oxygen under pressure as an agitating medium. Fresh pulp was fed into the first tank of the series and advanced in countercurrent to the flow of ammoniacal leach solution from the third tank of the series. The charge to the third tank was partly leached concentrate from the second tank and concentrated ammonia ($NH_4OH$), about 28% $NH_3$ concentration, in the ratio of about one part concentrate, one part concentrated aqueous ammonia and one part water. The leach solution from this tank contained from about 15 to about 20 grams of nickel per litre.

The solids from the third tank were filtered, washed and discarded, the filtrate and wash solution being returned to the leaching tanks.

The charge to the second pachuca tank consisted of partially leached concentrate from the first tank, leach solution from the third tank, and fresh concentrated ammonia in the ratio of about 1.5 parts pulp, one part aqueous ammonia and two parts leach solution from the third tank. The solids from this tank were passed to the third leaching tank and the leach solution, containing from about 45 to about 50 grams of nickel per litre, was passed to the first leaching tank.

The charge to the first leaching tank consisted of fresh concentrates from the grinding operation, leach solution from the second tank, and ammonia in the ratio of about 1.5 parts concentrates, 1 part aqueous ammonia (28% $NH_3$) and two parts leach solution from the second tank. The partially leached concentrates were passed to the second tank and the leach solution containing from about 65 to about 70 grams of nickel was passed to subsequent treatment.

Oxygen was admitted under pressure to each leaching tank and served the dual purpose of maintaining the contents of the tanks in a state of active agitation and oxidized the iron present to ferric hydroxide, in which form it was present as a flocculent precipitate and was removed with the leached solids, thus leaving the solution substantially free from iron.

The time of the leaching operation, which is dependent on a number of factors such as agitation, the extent of the leach desired, temperature, pressure, etc., was about ten hours and the pulp tailing discharged from the first leaching tank contained from about 0.5 to 0.7% nickel and from about 0.05 to 0.10% copper indicating an extraction of about 92% of the nickel and about 83% copper from the feed material to the grinding step.

The leach solution from each tank was filtered before passing it to the next tank in the series to maintain a liquid to solid ratio of about 2:1.

It was found that the nickel content of the leach solution could be increased to about 90 grams per litre by introducing gaseous ammonia into the first pachuca tank during the leaching operation. Ordinarily, however, a satisfactory solution containing from 65 to 70 grams of nickel was obtained without the addition of ammonia other than that fed into the final pachuca tank.

The leaching conditions do not appear to be critical in that relatively wide variations in the ammonia, nickel, copper and sulphate content of the leach solution do not appear to reduce the efficiency of the extraction of nickel provided the starting material is composed of sulphides. The velocity of the leaching operation increases with the fineness of the grind.

The ammonia is not destroyed during leaching. Rather, it remains in the solution as free ammonia, ammonium-nickel-copper complexes, ammonium sulphate and ammonium thiosulphate, from which it may be recovered or regenerated for reuse. A small amount, of course, may be adsorbed in the tailings and lost in the wash water.

Heat is generated during the leaching operation to the extent that the solution discharged from the first tank was of the order of from about 160° F. to 185° F. This solution was boiled, preferably flash boiled, to drive off the excess ammonia, which may be returned to the grinding or leaching steps, and filtered to remove the solids, which may be returned to the leaching stage, and then treated with 1:1 sulphuric acid to effect a separation, by precipitation, of nickel at about pH 6 as nickel ammonium sulphate, $NiSO_4(NH_4)_2SO_4 \cdot 6H_2O$. The nickel ammonium sulphate precipitate was washed several times with acidulated ammonium sulphate from the subsequent neutralizing step and the wash solution was returned to the filtrate from the sulphuric acid precipitation step. The nickel ammonium sulphate precipitate was then progressively heated to about 600° F. to drive off water, ammonia, ammonium sulphate, then to about 1100° F. to drive off sulphur dioxide and ammonium sulphate; then to about 1650° F. to decompose the nickel sulphate and drive off sulphur dioxide and sulphur trioxide. The nickel oxide remaining after this treatment was found to contain about 77.2% nickel, less than 0.03% copper, no iron, no cobalt and about 0.01% sulphur.

The copper was recovered, as above described, as copper sulphide containing from 30% to 60% copper and the cobalt as cobalt sulphide containing from 6% to 16% cobalt, some nickel, a trace of copper and the balance sulphur. The concentration of copper and cobalt in these products depends, of course, on the procedure followed in their precipitation.

The process of the present invention possesses a number of important advantages. It makes possible the direct leaching of nickeliferous sulphide ore, concentrate, or matte and makes unnecessary the preliminary roasting and reduction steps which were heretofore necessary. This makes possible important savings in capital and operating costs, particularly in the case of ore deposits which are remote from coal and oil. The leach solution may be recovered having an extremely high nickel content from which the nickel may be recovered easily and inexpensively and of a high degree of purity.

The process is flexible and following the leaching stage any one or more of several desirable commercial products having a high degree of purity may be produced. In the modification of the process described above, nickel oxide is the end product. This nickel oxide is marketable as such or it may be reduced to metallic nickel according to conventional methods, such as by electrolysis. Among the other commercial products which may be recovered from the process, are nickel sulphate, anhydrous nickel ammonium sulphate, ammonium sulphate, copper sulphide, sulphur, impure cobalt sulphide, sulphuric acid or sulphur dioxide, ammonium persulphate by electrolysis of the filtrate from the cobalt sulphide precipitation step and calcium sulphate.

The process is substantially cyclic with respect to ammonia and sulphuric acid except for minor mechanical and washing losses. It is found that sufficient sulphur, sulphur dioxide and sulphur trioxide are liberated to provide the sulphuric acid necessary for the solution treatment and possibly provide some excess acid if desired. The only materials which must be imported into the process other than a very minor amount of ammonia are the oxygen for the grinding and leaching steps, the limestone for neutralizing the acid solution, of the order of about 100 pounds per ton of concentrate, and lime for regeneration of the ammonia, of the order of about 300 to 400 pounds per ton of concentrate. In the main, low temperatures are involved in the operation of the process and the only high temperature required is that for the final treatment of the nickel ammonium sulphate precipitate for the production of nickel oxide. The process may be operated as a batch operation, and may be operated very economically to produce a diversity of high quality products.

It will be understood that the term "essentially" used hereinabove and in the appended claims is intended to mean that nickeliferous sulphides are included in and form an essential part of the material being treated, although they may constitute only a minor percentage of the material, and the material may contain, and usually does contain, greater or smaller percentages of other metal values such as iron, copper and cobalt and other metals associated therewith.

What I claim as new and desire to protect by Letters Patent of the United States is:

1. The method of extracting nickel values from nickeliferous sulphides which comprises the step of leaching finely pulverulent material consisting essentially of nickeliferous sulphides with strong aqueous ammonia substantially free from ammonium carbonate in a reaction zone, agitating the mixture in the reaction zone, and feeding an oxidizing gas into the agitated mixture during the leaching operation.

2. The method of extracting nickel values from nickeliferous sulphides which comprises the step of leaching finely pulverulent material consisting essentially of nickeliferous sulphides with strong aqueous ammonia substantially free from ammonium carbonate in a reaction zone maintained under superatmospheric pressure, agitating the mixture in the reaction zone, and feeding an oxidizing gas into the agitated mixture during the leaching operation.

3. The method of extracting nickel values from nickeliferous sulphides which comprises the steps of grinding a material consisting essentially of nickeliferous sulphides in strong aqueous ammonia substantially free from ammonium carbonate, leaching the pulverulent material with strong aqueous ammonia substantially free from ammonium carbonate in a reaction zone maintained under superatmospheric pressure, agitating the mixture in the reaction zone, and feeding an oxidizing gas into the agitated mixture during the leaching operation.

4. The method of extracting nickel values from nickeliferous sulphides which comprises the steps of leaching finely pulverulent material consisting essentially of nickeliferous sulphides with strong aqueous ammonia substantially free from ammonium carbonate in a reaction zone maintained under superatmospheric pressure, agitating the mixture in the reaction zone, feeding an oxidizing gas into the agitated mixture during the leaching operation, separating the solids from the leach solution, and separately recovering the nickel values from the leach solution.

5. The method of extracting nickel values from nickeliferous sulphides which comprises the steps of leaching finely pulverulent material consisting essentially of nickeliferous sulphides with strong aqueous ammonia substantially free from ammonium carbonate in a plurality of stages in reaction zones maintained under superatmospheric pressure, charging fresh pulverulent material into and discharging leach solution containing nickel values from the first leaching stage, and charging fresh aqueous ammonia into and discharging leached solids from the final leaching stage, agitating the mixtures in the reaction zones, and feeding an oxidizing gas into the agitated mixtures during the leaching operations, separating the solids from the discharged leach solution, and separating and recovering the nickel values from the leach solution.

6. The method of extracting nickel values from nickeliferous sulphides which comprises the steps of leaching finely pulverulent material consisting essentially of nickeliferous sulphides with strong aqueous ammonia substantially free from ammonium carbonate in a reaction zone maintained under superatmospheric temperature and pressure, agitating the mixture in the reaction zone, feeding into the agitated mixture during the leaching operation an oxidizing gas selected from the group consisting of oxygen, oxygen enriched air and air, and separating the nickel values from the leach solution.

7. The method of extracting the nickel, copper and cobalt values from nickeliferous copper and cobalt bearing sulphide ores and concentrates which comprises the steps of leaching finely pulverulent material consisting essentially of nickel, copper and cobalt sulphides with strong aqueous ammonia substantially free from ammonium carbonate in a reaction zone maintained under superatmospheric pressure, agitating the mixture in the reaction zone, feeding an oxidizing gas into the agitated mixture during the leaching stage, and separating and separately recovering the nickel, copper and cobalt values from the leach solution.

8. The method of extracting nickel values from nickeliferous sulphides which comprises the steps of thoroughly dispersing finely pulverulent material consisting essentially of nickeliferous sulphides in a leach solution consisting essentially of strong aqueous ammonia in a reaction zone maintained under superatmospheric pressure, agitating the mixture in the reaction zone, and feeding an oxidizing gas into the agitated mixture during the leaching operation, the dissolution of the nickel values in the leach solution being effected essentially by the reaction between the nickel values in the nickeliferous sulphides, strong aqueous ammonia substantially free from ammonium carbonate and the oxidizing gas.

FRANK A. FORWARD.

REFERENCES CITED

The following references are of record in the file of this patent:

UNITED STATES PATENTS

| Number | Name | Date |
| --- | --- | --- |
| 489,574 | Thompson | Jan. 10, 1893 |
| 489,575 | Thompson | Jan. 10, 1893 |
| 489,576 | Thompson | Jan. 10, 1893 |
| 489,881 | Thompson | Jan. 10, 1893 |
| 1,047,825 | McKechnie | Dec. 17, 1912 |
| 1,487,145 | Caron | Mar. 18, 1924 |
| 2,056,764 | Beatty | Oct. 6, 1936 |
| 2,293,066 | Lord | Aug. 18, 1942 |
| 2,400,098 | Brogden | May 14, 1946 |
| 2,400,115 | Hills | May 14, 1946 |

FOREIGN PATENTS

| Number | Country | Date |
| --- | --- | --- |
| 13,851 | Great Britain | 1894 |
| 514,538 | Great Britain | Nov. 10, 1939 |

OTHER REFERENCES

"A Course in General Chemistry," 3rd. ed., page 278, by McPherson and Henderson. Ginn & Co., N. Y.

"A Comprehensive Treatise on Inorganic and Theoretical Chemistry," vol. 15, pages 21–22, J. W. Mellor. Longmans, Green & Co., N. Y.